April 16, 1957     A. JENTSCH ET AL     2,788,692
MULTIPLE PRECISION CARRIAGE STOP
Filed March 5, 1954     2 Sheets-Sheet 1
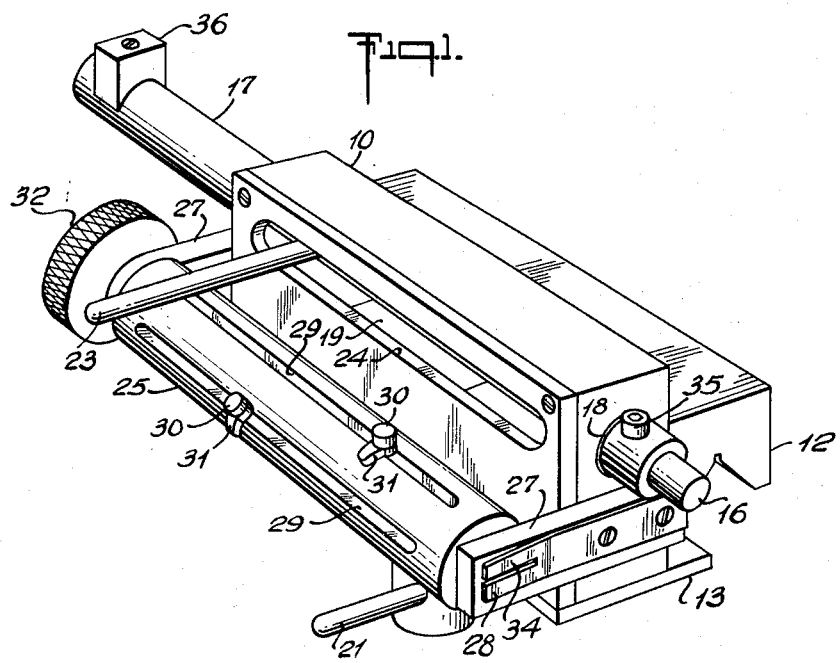
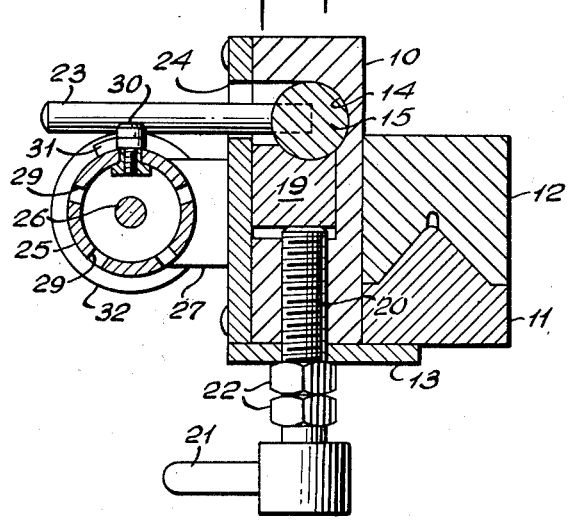
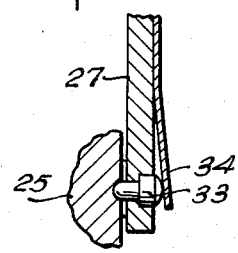
INVENTORS
ALEXANDER JENTSCH
RUDOLPH JENTSCH
BY
ATTORNEYS April 16, 1957  A. JENTSCH ET AL  2,788,692
MULTIPLE PRECISION CARRIAGE STOP
Filed March 5, 1954  2 Sheets-Sheet 2
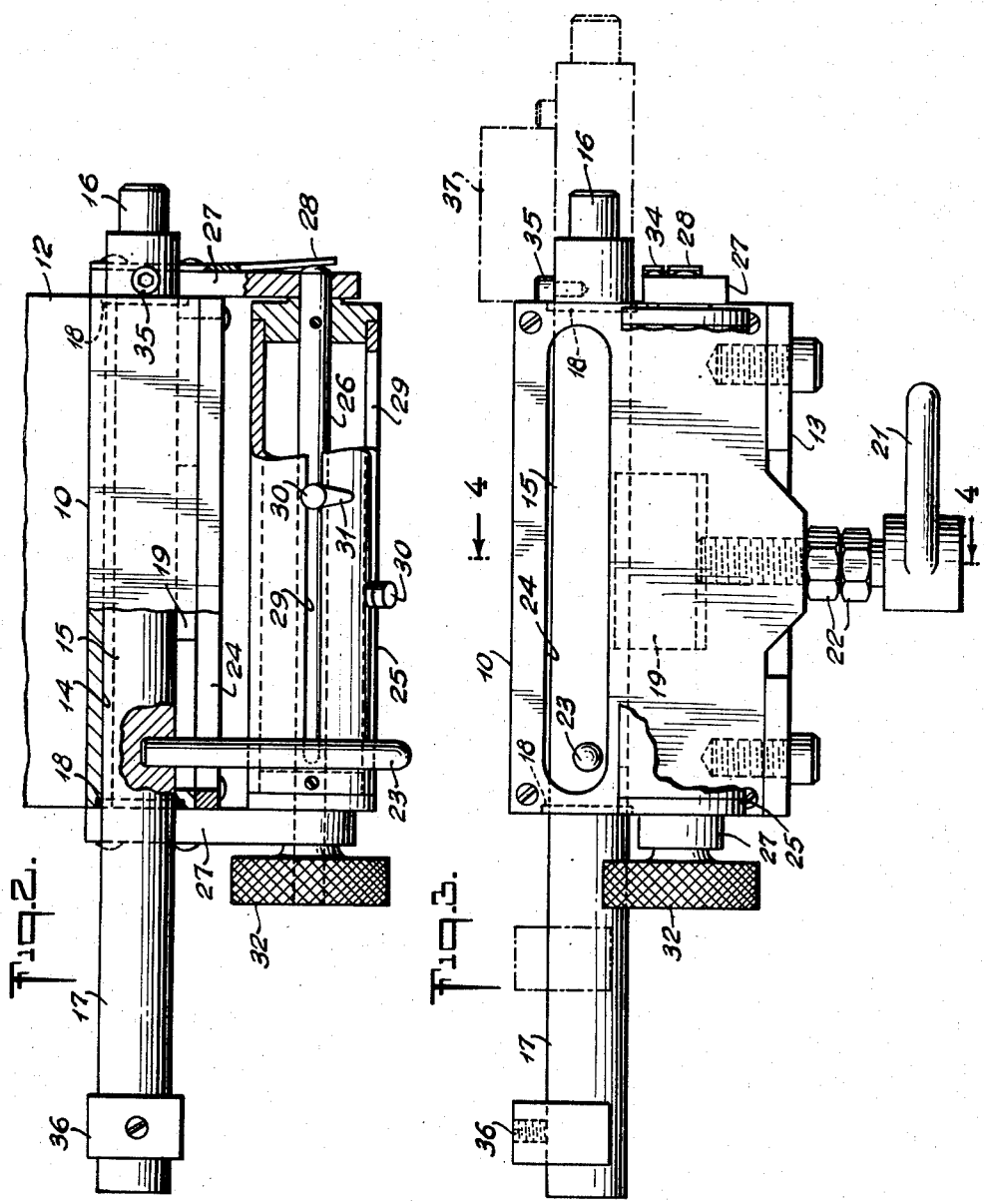
INVENTORS
ALEXANDER JENTSCH
RUDOLPH JENTSCH
BY
ATTORNEYS

United States Patent Office 2,788,692
Patented Apr. 16, 1957

2,788,692
MULTIPLE PRECISION CARRIAGE STOP

Alexander Jentsch, Passaic, and Rudolph Jentsch, Clifton, N. J., assignors to Edward Jentsch, Inc., Clifton, N. J., a corporation of New Jersey Application March 5, 1954, Serial No. 414,254

5 Claims. (Cl. 82—34)

The present invention relates to improvements in carriage stops for machine tools and relates, more particularly, to a precision stop having a multiplicity of positions for determining movements of a machine tool.

An object of the present invention is to provide a positive and accurate stop for a machine tool or the like such as a traversing tool having lateral, vertical or angular movement and to provide a stop with which errors, if made, will not be duplicated or be cumulative in subsequent movements of the tool. Another object of the invention is to provide a stop for a machine tool which will not be affected by debris from the machine such as chips, oil, etc., or by normal temperature changes in establishments where machine tools are used.

Another object of the invention is to provide a stop for a machine tool having a series of stops for a number of operations of the tool which may be rapidly and accurately placed in operative position by the operator of the machine tool. A further object of the invention is to provide a stop for a machine tool of a simple construction which has the ability to retain its accuracy after a long period of hard usage and will not be damaged by overtravel of the carriage under power.

Other objects and advantages of the invention will be apparent and best understood from the following description and the accompanying drawings in which:

Fig. 1 is a perspective view of a carriage stop embodying the present invention;

Fig. 2 is a plan view in partial section, as seen from the top, of the carriage stop shown in Fig. 1;

Fig. 3 is a front elevation of the carriage stop shown in Fig. 1;

Fig. 4 is a section view taken along the line 4—4 of Fig. 3; and

Fig. 5 is a fragmentary view in section of a portion of the stop shown in Fig. 1.

Referring to the drawings in detail, there is a supporting member in the form of a main block 10 which is secured to the bed 11 of a machine tool by suitable clamping members 12 and 13.

An opening or bore 14 extends lengthwise of the main block at the top thereof and a stop bar 15 is slidably mounted in said bore. The ends 16 and 17 of the stop bar 15 project beyond the ends of the main block so as to permit movement of the stop bar relative to the main block to the desired positions. When the device is in operation the end 16 of the stop bar engages with the carriage of the machine tool when the tool has been moved an appropriate distance in its operation. Washers 18 located at the ends of the opening 14 in the block form a seal with the stop bar and prevent cuttings or the like from entering the opening in the block.

As shown best in Fig. 4, a brake block 19 is slidably mounted in the main block and is movable into and out of engagement with the stop bar by a turn screw 20 which is threaded in the main block. The turn screw 20 extends beyond the bottom of the main block and has a handle 21 thereon by which it may be readily turned.

Jam nuts 22 on the turn screw limit the movement of the turn screw in a direction to bring the brake block into engagement with the stop bar. The jam nuts 22 are adjusted so that the brake block cannot be forced into engagement with the stop bar that would prevent movement of the stop bar in the main block in case excessive force is exerted against the stop bar as by overtravel of the carriage under power.

A positioning handle 23 is secured to the stop bar and projects through a slotted opening 24 in the front face of the main block. The stop bar may be moved to different positions by means of the positioning handle when the brake block is released. The positioning handle normally rests on the top of a slotted cylinder 25 which is rotatably supported in front of the main block with its axis extending lengthwise thereof. As shown in Fig. 2, the cylinder 25 is supported on a shaft 26 which is journalled in arms 27 secured to the main block. A spring finger 28 bears against one end of the shaft 25 and holds the cylinder in a fixed position against one of the arms. This prevents end play or lateral movement of the cylinder relative to the arms.

The surface of the cylinder 25 contains a plurality of slots 29 extending axially thereof and one of more adjustable positioning lugs or stops 30 are located in each of the slots. The positioning stops 30 are slidable lengthwise in the slots 29 and may be clamped in a desired position therein. Reference tabs 31 may be secured to the positioning stops to indicate a desired sequence of operations.

The positioning handle 23 on the stop bar is brought into engagement with one of the positioning stops 30 to position the stop bar at the proper position for the operation of the tool indicated by the reference tab. A knurled knob 32 is secured to one end of the shaft supporting the slotted cylinder so that the slot in which the desired positioning stop is located may be readily brought into position to engage the positioning handle. As shown in Fig. 5, a detent 33 is urged into engagement with one end of the cylinder by a spring finger 34 to hold the cylinder against accidental rotation.

It will be seen from the foregoing that a number of positioning stops 30 may be located in each of the slots 29 and the cylinder, depending on its diameter, may contain any desired number of slots. Such a construction not only provides a carriage stop that is simple and foolproof to operate, but it also provides for the control of practically any number of desired operations of the tool.

Reference members in the form of a cap screw 35 and a block 36 project from the stop bar opposite ends thereof. The reference members 35 and 36 serve to position the stop bar in setting the adjustable stops at the proper positions in the slots for a desired series of tool movements. In setting the stop up for operation, one of the reference members is moved into engagement with one end of the main block and the entire device is then slid along the bed of the tool until the end 16 of the stop bar is located at a zero position. The selection of the reference member engaging with the main block will depend on the direction in which the stop bar is to be moved from the zero point for the following movements of the tool.

With the end of the stop bar in this position, the entire device is clamped in place on the tool bed. A gauge block 37 or other measuring device which corresponds to the desired movement of the tool is then inserted between the one end of the main block and the reference member which was in engagement therewith, as shown in dot and dash lines in Fig. 2. This will properly position the end 16 of the stop bar to engage the tool upon the desired movement thereof. The stop bar is then clamped against movement in the main block and one of positioning stops 30 is slid along its slot in the cylinder until it engages with the positioning handle on the stop bar. The positioning stop is then secured in place in its slot. Thereafter when the handle is brought into engagement with such positioning stop it will automatically place the stop bar in this same position.

This operation is then repeated until the number of positioning stops for the desired number of movements of the tool have been set in their proper positions. It should be noted that the handle on the stop bar is brought into engagement with the adjustable positioning stops on the rear sides thereof so that if the operator neglects to stop the movement of the tool after the carriage contacts the stop bar, movement of the stop bar by the carriage will not disturb the position of the positioning stop or damage the device.

The operation of the device after the adjustable positioning stops have once been properly set for the desired movements of the tool, is simple and foolproof. The operator of the tool merely turns the cylinder so that the slot containing the adjustable positioning slot corresponding to the desired movement of the tool is at the top of the cylinder and in position to engage with the positioning handle on the stop bar. With the brake block released, the stop bar is then moved by means of the handle to a position where the handle engages with the rear of the selected positioning stop and the brake block is then set to clamp the stop bar in place.

The operation of the tool then takes place and when the tool has moved the proper distance during its operation, the carriage will approach and contact the end of the stop bar. Generally, the final movement of the tool to bring the carriage into engagement with the stop bar will be carried out by hand so that the stop bar will not be moved accidentally. However, if this is not done and the carriage continues to move under power, the stop will not be damaged as the stop bar will be moved in the main block against the friction of the brake and the handle will move away from the positioning stop on the cylinder.

With a device of the character described, cumulative errors on the part of the operator are eliminated. In other words, if an error is made in one setting of the device for one movement of the tool, such error will not be added to or affect subsequent movements of the tool.

It will also be understood that various modifications and changes may be made in the illustrated embodiment of the invention without departing from the scope of the invention as defined by the following claims.

We claim:

1. In a stop for indicating movement of a tool to a series of different positions thereof, a supporting member, a bar slidably carried by the supporting member, said bar being movable lengthwise of the supporting member and having one end positioned to engage with a tool, a handle carried by the bar for moving the bar to different positions relative to the supporting member, a cylinder rotatably carried by the supporting member, said cylinder having its axis extending lengthwise of the supporting member and having a series of spaced slots in the surface thereof, said slots extending axially of the cylinder, positioning stops adjustably carried in said slots, the positioning stops in the respective slots being movable upon rotation of the cylinder into positions for engagement with the handle on the bar, and releasable brake means for engaging with and frictionally holding the bar against movement relative to the supporting member at selected positions thereof.

2. In a stop for indicating movement of a tool to a series of different positions thereof, a supporting member, a bar slidably carried by the supporting member, said bar being movable lengthwise of the supporting member and having one end positioned to engage with a tool, a handle carried by the bar for moving the bar to different positions relative to the supporting member, a cylinder rotatably carried by the supporting member, said cylinder having its axis extending lengthwise of the supporting member and having a series of spaced slots in the surface thereof, said slots extending axially of the cylinder, positioning stops adjustably carried in said slots, the positioning stops in the respective slots being movable upon rotation of the cylinder into positions for engagement with the handle on the bar, spring means for holding the rotatable cylinder against lengthwise movement relative to the supporting member, a spring detent engaging with the cylinder against rotation relative to the supporting member, and releasable brake means for engaging with and frictionally holding the bar against movement relative to the supporting member at selected positions thereof.

3. In a stop for indicating movement of a tool to a series of different positions thereof, a supporting member, a stop bar slidably carried by the supporting member, said bar being movable lengthwise of the supporting membe and having one end positioned to engage with a tool, members projecting from the stop bar at opposite ends thereof, said last-mentioned members being movable with the stop bar into engagement with opposite sides of the supporting member for positioning the stop bar in zero positions thereof, a handle carried by the bar for moving the bar to different positions relative to the supporting member, a cylinder rotatably carried by the supporting member, said cylinder having its axis extending lengthwise of the supporting member and having a series of spaced slots in the surface thereof, said slots extending axially of the cylinder, positioning stops adjustably carried in said slots, the positioning stops in the respective slots being movable upon rotation of the cylinder into positions for engagement with the handle on the bar, and releasable means for engaging with frictionally holding the bar against movement relative to the supporting member at selected positions thereof.

4. A stop for indicating movement of a tool for a predetermined distance in the operation thereof wherein a supporting member is attached to a frame having a tool movably mounted thereon and a stop bar is slidably carried by said supporting member and is movable lengthwise thereof to different positions, said stop bar having one end positioned for engagement with the tool upon movement thereof which is characterized by a positioning handle carried by and projecting from said movable stop bar, an elongated member rotatably carried by said supporting member, said elongated member having its axis extending lengthwise of the supporting member and having a series of spaced slots in the surface thereof, said slots extending axially of the elongated member and positioning stops adjustably carried in said slots, the positioning stops in the respective slots being movable upon rotation of the elongated member into positions for engagement with the positioning handle on the stop bar, said handle engaging with the sides of said stops furthest away from the tool and being movable out of engagement with the stops upon movement of the stop bar under the influence of the tool.

5. A stop for indicating movement of a tool as defined in claim 4 which includes releasable clamping means carried by the supporting member for frictionally engaging with and holding the stop bar in a selected position.

References Cited in the file of this patent

UNITED STATES PATENTS

| | | |
|---|---|---|
| 1,121,068 | Chard | Dec. 15, 1914 |
| 1,480,522 | Ferguson | Jan. 8, 1924 |
| 2,455,793 | Monkiewicz | Dec. 7, 1948 |

FOREIGN PATENTS

| | | |
|---|---|---|
| 854,941 | France | May 19, 1939 |